July 27, 1965 G. A. MARSH 3,197,724
ELECTRICAL RESISTANCE CORROSION PROBE
Filed Nov. 20, 1959 3 Sheets-Sheet 1

INVENTOR.
GLENN A. MARSH
BY Edward H. Sang
ATTORNEY

July 27, 1965　　　G. A. MARSH　　　3,197,724
ELECTRICAL RESISTANCE CORROSION PROBE
Filed Nov. 20, 1959　　　3 Sheets-Sheet 2

INVENTOR.
GLENN A. MARSH
BY Edward H. Lang
ATTORNEY

July 27, 1965

G. A. MARSH 3,197,724

ELECTRICAL RESISTANCE CORROSION PROBE

Filed Nov. 20, 1959

INVENTOR.
GLENN A. MARSH
BY
*Edward H. Lang*
ATTORNEY

United States Patent Office 3,197,724
Patented July 27, 1965

3,197,724
ELECTRICAL RESISTANCE CORROSION PROBE
Glenn A. Marsh, Crystal Lake, Ill., assignor to The Pure Oil Company, Chicago, Ill., a corporation of Ohio
Filed Nov. 20, 1959, Ser. No. 854,410
12 Claims. (Cl. 338—13)

This invention relates to a device and method for estimating or determining the rate of corrosion of a metallic specimen exposed to a corrosive environment and, more particularly, the invention relates to the use of a metallic test specimen of longitudinally-graduated thickness exposed to the corrosive atmosphere and means for determining the electrical continuity along said variable or graduated thicknesses of the test specimen.

The problem of measuring corrosion rates has been approached by various means and methods. Oxygen absorption rates are tedious and subject to error. Weight-loss determinations give more reliable results but are time-consuming and also tedious. These methods and related methods cannot be applied to the study of corrosion under field conditions, that is, in pipe lines, processing vessels or parts of apparatus which are inaccessible. The use of the correlation between change in electrical resistance and change in cross-sectional area employing test specimens requires the use of more complicated resistance-change-measuring equipment and temperature compensation due to thermal influences. It is also known to use wedges of a corrodible bearing metal, having a graduated thickness, which are plates on a support and the rate of corrosion is observed by visual observation of those spots where the portions of the wedge steps thereon, of known thickness, are corroded through to the support member. This, however, does not give a continuous picture of the corrosion rate as time progresses without removal and visual inspection of the wedge. Furthermore, the accuracy is dependent on the accuracy with which the thicknesses of metal are applied and the experience with the various corrosion patterns of exposed support that are formed therethrough.

Accordingly, the primary object of this invention is to provide a corrosion-testing device or probe for estimating the corrosion rate of a metallic specimen in a corrosive atmosphere.

Another object of this invention is to provide a method for estimating or determining the corrosiveness of a corrosion atmosphere.

Another object of this invention is to provide a corrosion test element having a longitudinally-graduated thickness of corrodible metal adapted to be exposed to a corrosive atmosphere.

Still another object of this invention is to provide a corrosion-test probe comprising a test element having a longitudinally-graduated thickness of corrodible metal adapted to be exposed to a corrosive atmosphere, and means for determining the electrical continuity at regular intervals on the length thereof.

A further object of the invention is to provide a corrosion test probe comprising a non-corrodible, non-conducting base member supporting a metallic test element having a longitudinally-graduated thickness, and electrical means attached to the metallic test element at regular intervals along its length to determine the electrical continuity between said intervals.

These and other objects of this invention will be described or become apparent as the description thereof proceeds.

A feature of this invention is the provision in a corrosion-test probe of the combination of an electrically non-conductive base support member having thereon a metallic test element of a corrodible metal or metal alloy, said element having a longitudinally-graduated or stepped thickness, electrical leads attached to the metallic test element at regular or known spaced intervals, and means connected to the leads to determine the electrical continuity between the points of attachment of the leads.

The invention is best understood in relation to the drawings wherein.

Figure 1:
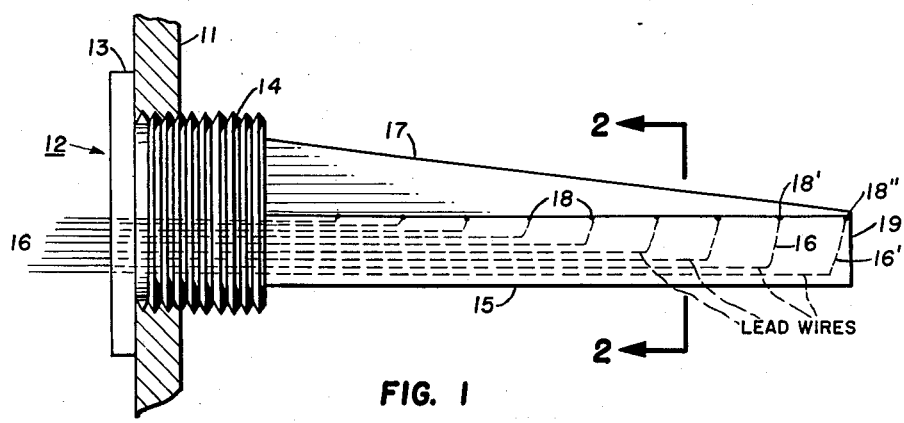
FIGURE 1 is a side view in partial cross-section of one form of corrosion-test probe showing the attachment through the wall of a vessel confining a corrosive atmosphere.

Referring to the drawings wherein corresponding parts bear the same numeral and the specific embodiments shown are merely illustrative, in FIGURE 1 the wall 11 represents the wall of the vessel or apparatus confining the corrosive atmosphere under test. A base or plug member 12 is provided having flange 13 and threaded portion 14 adapted to be inserted in sealed relationship through an aperture in the wall 11, and act as a seal and support for base member 15 which extends therefrom.

Plug member 12 and base member 15 may be made from the same piece of material and are preferably constructed of a material which is non-conductive to an electric current. A plurality of electrical lead wires 16 extend through plug member 12 and into base member 15. Each electrical lead 16 is attached to the wedge-shaped test element 17 at uniformly spaced points along the under or non-exposed side thereof, as indicated at point of attachment 18. Test element 17 is of longitudinally-graduated thickness from the end adjacent to plug 12 to the extended end thereof which coincides approximately with the end 19 of base member 15. Test element 17 is composed of a metallic, conductive, and corrodible material of construction, the properties of which are under study in connection with the corrosive atmosphere. Base member 15 may have a longitudinal opening extending along its length and terminating at a vertical wall as indicated at 19 and shown more clearly in FIGURE 2. In this arrangement, the test element 17 is attached to the parallel, upwardly-extending walls 20 of base member 15, and the plurality of leads are housed within the aperture or hollow 21 so as to be protected from the corrosive atmosphere.

Figure 2:
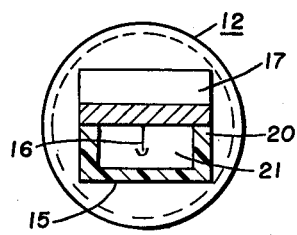
FIGURE 2 is a cross-section of the corrosion-test probe shown in FIGURE 1 taken along lines 2—2 wherein the supporting non-conductive base member is hollow.
Figure 2A:
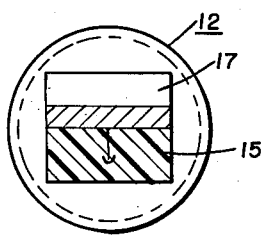
FIGURE 2a is a cross-section of the corrosion-test probe shown in FIGURE 1 taken along lines 2—2 wherein the supporting non-conductive base member is solid.

In FIGURE 2a, which illustrates an embodiment herein, the base member 15 is formed of a solid piece of non-conductive material, the various leads are imbedded therein and thus protected from the corrosive atmosphere.

Figure 3:
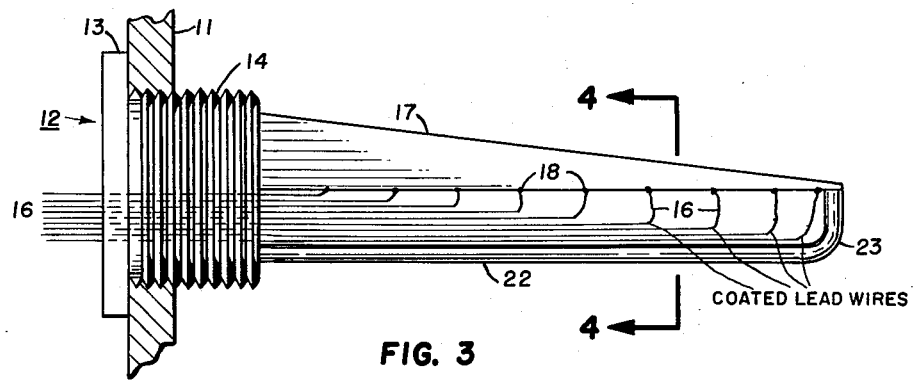
FIGURE 3 is a side view in partial cross-section of another form of corrosion-test probe showing attachment to a wall and employing a rod-like, non-conductive base member.
Figure 4:
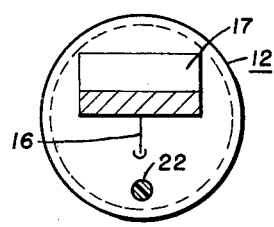
FIGURE 4 is a cross-sectional view of the corrosion-test probe shown in FIGURE 3 taken along lines 4—4.

The foregoing types of construction may be altered by utilizing electrical leads which are coated so as to be individually protected from the corrosive atmosphere. This type of construction eliminates the necessity of using base member 15 as a protection for the electrical leads. This embodiment is shown in FIGURE 3 wherein the corresponding parts from FIGURE 1 bear the same numerals. In this embodiment, the base member is shown as a rod 22 of non-conductive material extending from plug member 12 and having an up-turned end 23 which attaches to the extended and thinner end of wedge-shaped test element 17. This arrangement of parts is also illustrated in the cross-sectional view shown in FIGURE 4.

Figure 5:
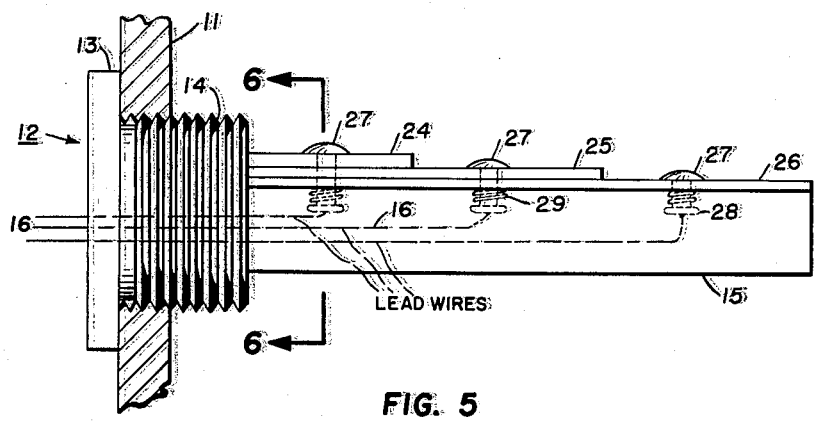
FIGURE 5 is a side view in partial cross-section showing another form of corrosion-test probe showing attachment to a wall and employing a plurality of riveted plates in overlapping position on a supporting base member.

In FIGURE 5 another form of test element is shown supported on a base member 15 wherein the base member corresponds to the embodiments shown in FIGURES 1, 2 and 2a. In FIGURE 5, the test element comprises a plurality of leaves or sheets 24, 25 and 26 which are held together by fastening members 27 shown in the form of spring-loaded rivets. The upper side of the sheets 24, 25 and 26 are exposed to the corrosive atmosphere and the under side of sheet 26 is in sealed relationship with the top surface or edges of base member 15. The leads 16 pass through the plug member 12 into the base member 15 in protected relationship and attach to the extended ends of fastening members 27. The lower ends of fastening members 27 may be burred or riveted as indicated at 28 in order to retain spring 29 against sheet 26.

Figure 6:
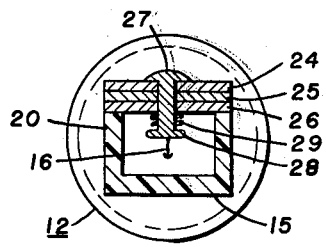
FIGURE 6 is a cross-sectional view of the corrosion-test probe shown in FIGURE 5 taken along lines 6—6 wherein the supporting, non-conductive, base member is hollow.
Figure 6A:
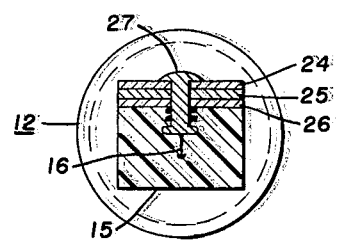
FIGURE 6a is a cross-sectional view of the corrosion-test probe shown in FIGURE 5 taken along lines 6—6 wherein the supporting, non-conductive, base member is solid.

In the embodiments shown in FIGURE 6, the base member 15 is substantially the same as that shown and described in connection with FIGURE 2, and the fastening members 27 may be spring-loaded rivets or have a riveted lower end 28 or a nut (not shown) to hold the sheets 24, 25 and 26 together. FIGURE 6a illustrates the construction for use with a solid base member 15, as shown in FIGURE 2a.

Figure 7:
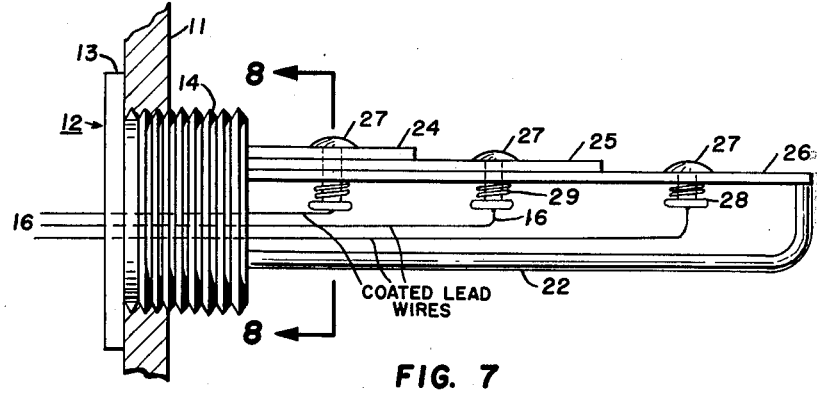
FIGURE 7 is a side view in partial cross-section similar to that of FIGURE 5 used but using a different type of supporting, non-conductive base member.
Figure 8:
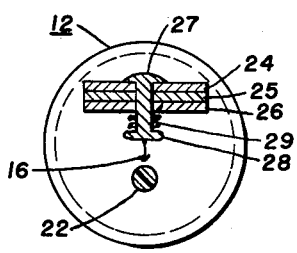
FIGURE 8 is a cross-sectional view of the corrosion-test probe shown in FIGURE 7 taken along lines 8—8.

In FIGURE 7, the arrangement of test element in the form of sheets 24, 25 and 26, as shown in FIGURE 5, has been used with the rod-like base member 22 as shown in FIGURE 3. The relationship of the remaining parts is the same as in the preceding figures. The cross-section shown in FIGURE 8 further illustrates this arrangement of parts. The leads 16 are insulated or coated with a material adapted to insulate the leads from each other and protect same from the corrosive atmosphere. Rod 22 may attach to sheet 26 at a position other than at the end.

Figure 9:
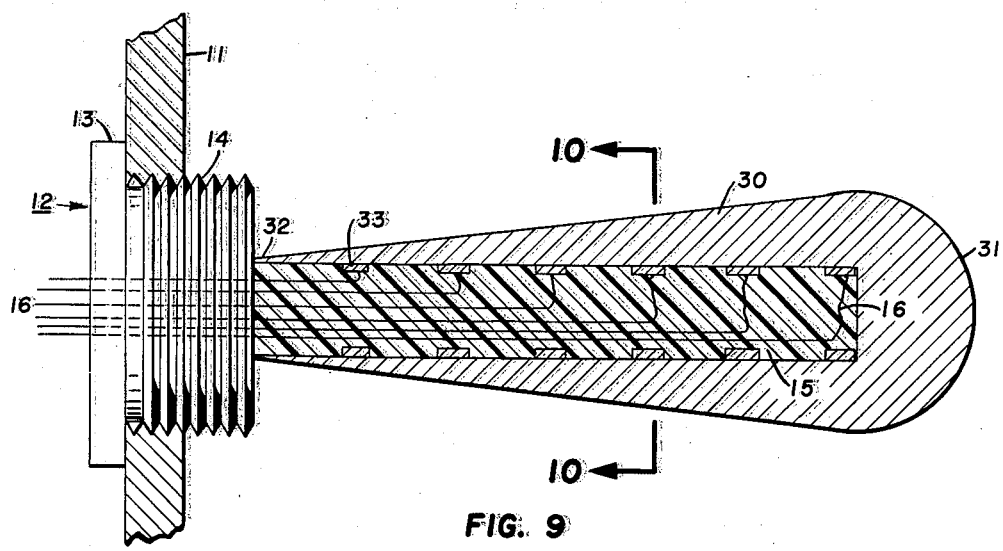
FIGURE 9 is a side view in partial cross-section showing still another form of the test probe attached to a wall of a vessel wherein an elongated, hollow tapered test element is supported by a non-conductive, elongated member extending into the hollow space of the test element.

In FIGURE 9 another arrangement of test probes in accordance with this invention is shown wherein the base member 15 is surrounded by a test element 30 frustoconical in shape except that the base end is rounded as shown at 31 and the thin portion thereof, indicated at 32, is adjacent to plug member 12. In this arrangement, a plurality of contact rings 33 are provided which are embedded in the base element 15 and to which attach the plurality of leads 16. This arrangement of parts is further illustrated in the cross-sectional view shown in FIGURE 10.

The base elements 15 and 22 may be composed of any non-conductive material which is adapted to form a support for the test element and expose same to the corrosive atmosphere. For this purpose, the base elements 15 and 22 are preferably constructed using non-corrodible electrically-insulating material. Where the maximum operating temperature of the probe does not exceed about 250° F., such materials as paper and fabric laminates, including XX phenolic, XXP phenolic, XXX phenolic, XXXP phenolic and epoxy resin laminates may be used. The maximum temperatures at which these laminates may be joined or formed into supporting members is about 400° to 450° F. with a time of heating of not more than about 5 seconds. Where glass fiber laminates are used for the supports, the maximum operating temperatures are: melamine, 260° F.; silicone, 300° F.; polystyrene, 170° F.; polyester, 250° F.; Teflon, 300° F.+; and epoxy, 250° F.+, but the binding temperatures are higher and the dimension stability is improved over paper and fabric laminates. Phenolic nylon fabric laminates may be used but their application is limited since their maximum operating temperature during fabrication or use is only about 165° F. Such ceramic insulators as titanite, steatite, glass-bonded mica and the like may be used and will withstand higher temperatures. The latter-named mica and inorganic materials can be fabricated and used at temperatures as high as 650° to 750° F. These materials, described at page 96 of Materials and Methods, vol. 42, No. 1, July 1955, exhibit good metal bonding strength, flexing strength, arc resistance and are of low cost.

In fabricating the test probes and test elements of this invention, care should be taken not to have dissimilar metals or conductive materials exposed to the corrosive atmosphere at adjacent portions of the apparatus where one of the exposed portions is the metal surface or material under test, because galvanic effects occur which lead to errors in the corrosion-rate determinations. The various test elements 17, 24, 25, 26 and 30 that have been shown are composed of the metal or metal alloy which corresponds to the material of construction, the corrosion properties of which are to be determined. Any of the various iron-containing alloys that are used to form apparatus walls, vessel walls, and apparatus parts which come in contact with a corrosive atmosphere may be used. The fastening members 27 are preferably either constructed of the foregoing non-conductive materials, or of a metal or metal alloy which has the same composition, corrosion properties and electrical conductivity as the test elements or sheets with which they are used. Similarly, the coatings applied to the leads 16 when exposed to the corrosive atmosphere may be selected from the foregoing non-conductive plastic materials. The points of contact 18 of the leads 16 with the underside or protected side of the test elements may be solder connections and similar modes of attachment.

The corrosive atmosphere may be liquid phase, gaseous phase, or mixed phase, or may contain suspended solids as in the fluid cracking system wherein particulate solid particles of catalyst are suspended in a hot mixture of hydrocarbons. The probe of this invention is applicable to the study of corrosion or erosion in any type of atmosphere which causes the disintegration of the confining vessel. Examples of corrosive or erosive atmospheres are acid solutions, brine solutions, drilling muds, alkaline solutions, acidic gases, ammonia, sulfur vapors, hydrogen sulfide, hydrochloric acid, hydrofluoric acid, air, moist air, steam and powdered solids.

Corrosion per se is generally associated with ferrous materials of construction although both corrosion, that is chemical disintegration and erosion, mechanical disintegration, constitute problems with materials of construction containing iron. The device of this invention and the methods to be described herein apply to studies of both erosion and corrosion, i.e., both types of disintegration, particularly as found in connection with ferrous materials of construction. The term corrosion as used herein is therefore intended to include both chemical and mechanical disintegration of materials of construction in contact with an atmosphere.

Although the invention has been illustrated by various embodiments, it is not to be limited thereby. The wedge-shaped test elements shown may be constructed to give a rough approximation of the corrosion rate both by using fewer electrical-continuity test-points, or by forming the test element of cast metal. More accurate corrosion-rate determinations can be obtained by using test elements that are comparatively long and machining the sloped surface to desired continuous or stepped-thickness changes. The points of attachment 18 of the lead wires 16 to the test element, or through contact rings 33, are spaced at points of known metal thickness of the test element, e.g., 0.0005, 0.0010, 0.0015 and 0.01 inch. In fabricating the device, the test element may be mounted, cemented, or press-fitted on the base element 15 and milled to the desired dimensions, thereby providing adequate support for the thin metal. The laminated sheets 24, 25 and 26 may be of shim stock or other thin metal sheet or foil of the metal to be studied. These sheets may be of the same or different thicknesses to make up desired overall thickness ratios along the length thereof. Also, the test elements may be fabricated so that the flat side thereof is exposed to the corrosive atmosphere and the sloping side is adjacent ot the base element or electrical lead contact points. The test element may also be fabricated without the insulating support 15 provided the thin end thereof is at a side away from the base 12. The insulated lead wires 16 may be used as the only support for the wedge-shaped test element 17.

Figure 10:
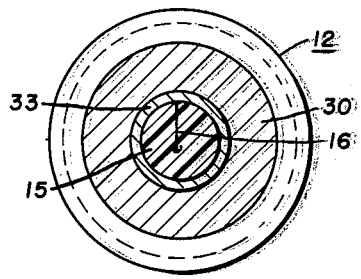
FIGURE 10 is a cross-sectional view of the test probe shown in FIGURE 9 taken along lines 10—10.

The rod assembly shown in FIGURES 9 and 10 may be prepared, for example, by disposing the rings and connected lead wires within a cylindrical or rectangular mold, and then casting the ceramic or plastic within the mold. In fabricating this apparatus, a very thin film, preferably only a few microinches thick, of iron is first "sputtered" or evaporated into the rod assembly, and then the rod is electroplated with the metal to be studied. The electroplating is done while withdrawing the rod from the plating bath at a uniform rate so as to deposit a tapered test element, as shown in exaggerated scale in FIGURE 9. An ohmmeter or other continuity tester is connected between the first pair of wires adjacent to the base 12 to determine the time at which ring 33 becomes electrically isolated from the remainder of element 30, and the test is conducted as hereinafter described with respect to FIGURE 1. The alternative methods described in connection with FIGURE 1 are equally applicable in using this embodiment.

The first step in using this device is to install it on the wall of a vessel in the environment under study. Then an ohmmeter or other circuit-continuity testing instrument is connected between lead wires attached to adjacent test element terminals, such as to wires 16 and 16' (FIGURE 1) attached to adjacent terminals 18' and 18'', respectively. When corrosion has decreased the thickness of test element 17 by an amount equal to the original thickness at the outermost terminal to which the tester is connected, the circuit tester indicates that continuity has been broken. When this discontinuity occurs, it is apparent that the metal has corroded to a depth equal to the thickness of the test element at terminal 18''. After the metal has corroded to this depth, the continuity-testing instrument is connected between the next adjacent pair of terminals, and the time at which discontinuity occurs between these terminals, denoting metal loss equal to the new thickness, is noted. This procedure is repeated as many times as necessary to establish the corrosion rate.

Similarly, one terminal of the continuity-indicating instrument may be connected to a terminal on the test element at its thickest point, and the second instrument terminal connected to lead wires from the other element terminals in sequence, progressing from the thin end toward the thick end of the element as each terminal, in turn, becomes isolated from the rest of the test element. A multiple-contact switch facilitates carrying out this method. Then too, this method may be made continuous and automatic by making the continuity indicator in the form of a multi-point resistance-recording instrument on which the resistance between the terminal at the thickest end of the test element and each of the other element terminals is recorded continuously versus time. When this is done, a graphical presentation of the times at which each of the element terminals becomes isolated, as indicated by a relatively sharp increase in resistance to a very high level, is obtained. The resulting data on times at which known thicknesses of metal have been corroded from the test element is plotted graphically, and an estimate of the corrosion rate may be determined in any convenient units, such as inches per year.

The embodiments of an invention in which an exclusive property or privilege is claimed are defined as follows:

1. A corrosion-test element for use in measuring the corrosion rate of a corrosive atmosphere on exposure of said element therein comprising, in combination, a plug member for installing said corrosion test element, an elongated corrodible metallic specimen extending from said plug member, said specimen being of substantially uniform composition having a known longitudinally graduated thickness between two surfaces thereof, at least one of which surfaces is exposed, a plurality of conductor means protected against corrosion from said corrosive atmosphere connected to said metallic specimen at spaced points of known thickness along one of said surfaces.

2. A corrosion-test element in accordance with claim 1 in which said metallic specimen is wedge-shaped.

3. A corrosion-test element in accordance with claim 1 in which said metallic specimen is generally frusto-conical in shape with the end opposite the plug end being rounded.

4. A corrosion-test element in accordance with claim 1 in which said metallic specimen comprises a plurality of elongated flat metallic specimens having substantially uniform composition, different graduated lengths and known thicknesses fastened together flat side to flat side with one end of each specimen being coextensive with the corresponding end of the other test specimens and the other ends of said specimens being non-coextensive, a portion of a flat side of each specimen being exposed to said corrosive atmosphere.

5. A corrosion-test probe comprising a base member, an insulating support member extending from said base member, an elongated corrodible metallic specimen of substantially uniform composition extending from said base member and supported by said support member, said metallic specimen having two opposing non-parallel longitudinal surfaces at least one of which is exposed, and conductor means protected against corrosion, connected to one of said surfaces at spaced points of known thickness between said non-parallel surfaces.

6. A corrosion-test probe comprising a base member adapted to be inserted in sealed relationship through the wall of a vessel confining a corrosion atmosphere, an elongated insulating support member attached to and extending from said base member, an elongated corrodible metallic specimen of substantially uniform composition extending from said base member and having an exposed surface and a protected surface, said protected surface of said metallic specimen being in supported contact with said insulating member, said exposed and protected surfaces of said metallic specimen being in non-parallel relationship so that said specimen has a graduated thickness between said surfaces and at least one pair of protected conductor means, extending through said base and support members, attached at spaced points of known thickness on said protected surface.

7. A corrosion-test probe comprising a base member adapted to be inserted in sealed relationship through the wall of a vessel confining a corrosive atmosphere, an elongated, hollow corrodible metallic test specimen of uniform composition, said test specimen having known graduated thickness along its length, with the thinnest end attached to said base member, an elongated insulating support member extending from said base member within said test specimen in sealed relationship therewith, a plurality of conductor means extending through said base and support members and terminating in electrical contact with the inside wall of said test specimen at spaced points of known wall thickness.

8. A corrosion-test probe comprising a base member adapted to be inserted in sealed relationship through the wall of a vessel confining a corrosive atmosphere, an elongated insulating support member attached to and extending from said base member, a plurality of flat corrodible metallic specimens extending from said base member and supported by said support member, said specimens being sandwiched together with their flat surfaces in electrical-conductive contact, said specimens being of substantially the same uniform composition and of known thickness between their flat sides, said specimens being of different lengths so that a portion of one side of each specimen is exposed to said atmosphere, a separate conductor means for each specimen extending through said base member and attached to said specimen at a point adjacent said exposed portion.

9. A corrosion-test probe in accordance with claim 8 in which said metallic specimens are attached to each other by spring-loaded rivet means extending therethrough, a spring-loaded rivet means is attached through the exposed portion of the longest metallic specimen, said rivet means having their spring-biased ends imbedded in said support member and said rivet means constitute the points of attachment for said conductor means.

10. A corrosion-test probe in accordance with claim 8 in which said conductor means are disposed within and protected by said support member.

11. A corrosion-test probe in accordance with claim 8 in which said metallic specimens are attached to each other by spring-loaded rivets extending therethrough, and a spring-loaded rivet is attached through the exposed end portion of the longest metallic specimen, said rivets having their spring-biased ends in and protected by said support member and same constituting the points of attachment for said conductor means.

12. A corrosion-test probe in accordance with claim 8 in which the support member is a rod-like member attached at one end to said base member and having the other end upturned and attached to the exposed end of the metallic specimen of greatest length.

References Cited by the Examiner

UNITED STATES PATENTS

| | | | |
|---|---|---|---|
| 1,547,837 | 7/25 | Steenstrup | 338—230 |
| 2,351,644 | 6/44 | Talley et al. | 23—253 |
| 2,735,754 | 2/56 | Dravnieks. | |
| 2,856,495 | 10/58 | Chittum et al. | 324—65 X |
| 2,915,305 | 12/59 | Craig | 73—86 X |
| 3,032,753 | 5/62 | Knapp et al. | 73—86 X |

OTHER REFERENCES

"Gas Age-Record," Legg, vol. 67, No. 4, Jan. 24, 1931, pages 111–115.

WALTER L. CARLSON, *Primary Examiner.*

SAMUEL BERNSTEIN, FREDERICK M. STRADER, *Examiners.*